Jan. 19, 1965    L. A. CARRIOL    3,166,217
LIQUID FLOW CONTROL APPARATUS
Filed March 5, 1962    3 Sheets-Sheet 1

INVENTOR
LOUIS AUGUSTE CARRIOL
BY
Pennie Edmonds Morton Barrows & Taylor
ATTORNEYS Jan. 19, 1965     L. A. CARRIOL     3,166,217

LIQUID FLOW CONTROL APPARATUS

Filed March 5, 1962     3 Sheets-Sheet 2

INVENTOR
LOUIS AUGUSTE CARRIOL
BY
ATTORNEYS 3,166,217
LIQUID FLOW CONTROL APPARATUS
Louis Auguste Carriol, Aulnay-sous-Bois, France, assignor to Société d'Etudes, d'Inventions et de Brevets, S.E.I.B., Paris, France, a company of France
Filed Mar. 5, 1962, Ser. No. 177,538
Claims priority, application France Mar. 3, 1961
5 Claims. (Cl. 222—20)

The present invention relates to apparatus for dispensing liquids, and more particularly to apparatus for dispensing liquids in selectable predetermined amounts.

In certain apparatus for the dispensing of metered quantities of liquids such as those described in U.S. Patent No. 2,990,977, a valve through which the liquid must pass to be delivered is closed upon the engagement of a movable element, coupled to a totalizing liquid meter, against a stop which is advanced into the path of that element by the operator at a position corresponding to the amount of liquid which is to be delivered.

The invention provides improved and simplified apparatus of this type, in which the movable element takes the form of a drum having a plurality of steps formed therein and wherein the stop, which may physically resemble a cam, is positionable by the operator in any one of plural angular positions, in each of which a different step on the drum will engage the stop. The stop itself is yieldably mounted, and its yielding motion under influence of the drum is employed in the process of effecting closure of the valve.

The invention will now be further described in terms of a non-limitative example by reference to the accompanying drawings in which.

Figure 3:
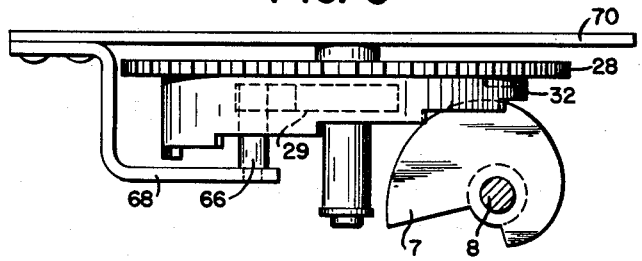
FIG. 3 is an enlarged sectional view taken on the line 3—3 of FIG. 2.
Figure 5:
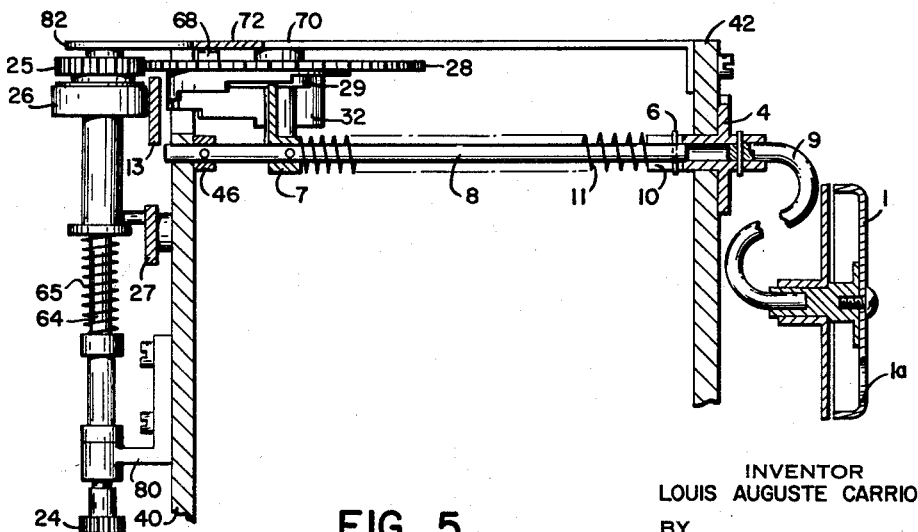
FIG. 5 is a section along the line 5—5 of FIG. 2.

In the apparatus of the invention, as illustrated in the drawings, the quantity of liquid to be dispensed is preset, before the beginning of delivery, by rotation of a stop plate or disc 7, hereinafter sometimes referred to as a cam (FIGS. 3 and 5) to a selected position. Cam 7 is affixed to a shaft 8, and possesses a radius from the axis of that shaft varying with angular position about that axis, as is clearly seen in FIG. 3. Shaft 8 is journaled at one end in a front plate 40 (FIG. 5). At its opposite end it is coaxially supported by, and possesses a pin and slot coupling 6 with, a detent wheel 4 which is journaled in a rear plate 42. The shaft 8 is axially movable with respect to the walls 40 and 42, but is stressed towards wall 40 by means of a compression spring 11, engaged between cam 7 and wheel 4. A collar 46 limits the motion of shaft 8 under the influence of this spring.

The angular setting of cam 7 is controlled by a disc 1 (FIG. 4) which has a hole 1a formed therein. Disc 1 is coupled, as by a flexible shaft 9, to detent wheel 4, and is arranged to be rotated in front of a dial 3, shown in FIGS. 4 and 5. The dial bears a series of numbers corresponding to quantities of liquid to be delivered. Rotation of the disc 1 by hand sets the cam 7 to any one of the positions corresponding to the numbers on dial 3, and the cam is then held in the selected angular position by engagement of spring-loaded pawl 5 (FIG. 4) with a notch in detent wheel 4.

Figure 1:
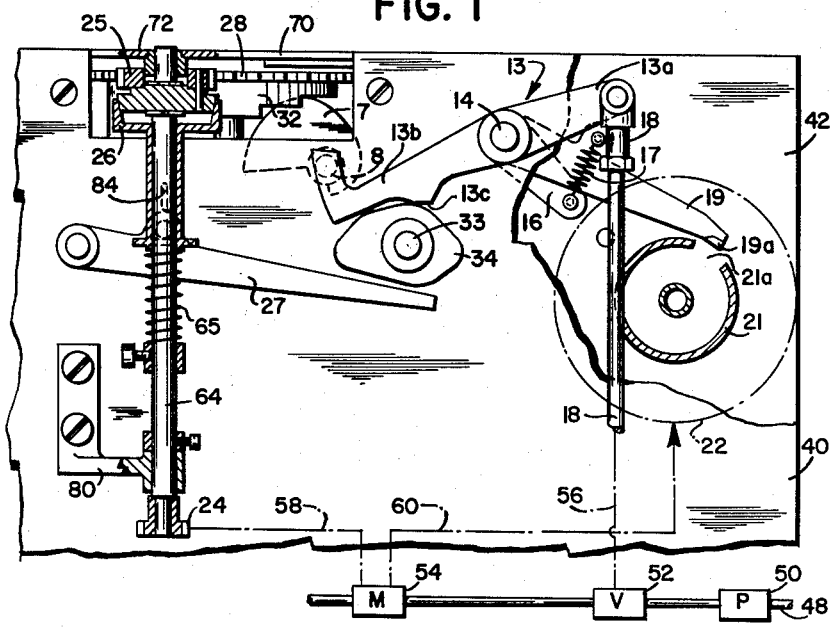
FIG. 1 is a front elevational view of one form of apparatus according to the invention, certain associated elements of structure being schematically shown.

Referring now to FIG. 1, a liquid delivery line is shown at 48. Inserted in this line are a pump 50, a valve 52, and a flow meter 54, preferably of positive displacement type. The pump is controlled by conventional means not shown. In applications of the invention to the delivery of liquid fuels for example, the pump control may include a switch operated at a nozzle (not shown) at the end of delivery line 48. An additional valve may be provided within the nozzle. The pump 50 and its control form no part of the present invention, and will not be further disclosed herein.

The valve 52 is coupled, by any suitable linkage 56, for example mechanical, electrical or both, to a rod 18. Valve 52 closes with upward motion of rod 18 and vice versa. The valve 52 may be of the type shown in French Patent No. 1,023,406.

Figure 2:
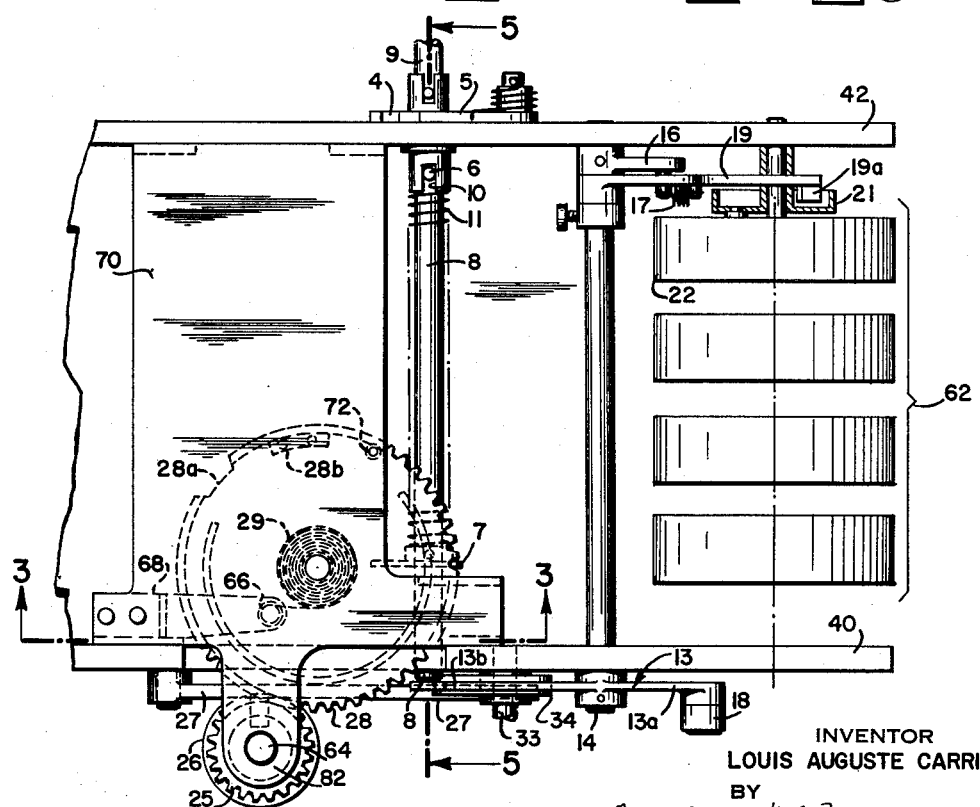
FIG. 2 is a plan view of the apparatus of FIG. 1.

The meter 54 delivers an output motion representative of the quantity of liquid which has passed through it, and this motion is delivered by a linkage 58 to a pinion 24 and also, by a linkage 60, to the drum 22 of lowest order of a plural drum counter generally indicated at 62 (FIG. 2). The counter 62 includes transfer means between adjacent drums, but since such counters are well known the details thereof have not been shown.

The rod 18 (FIG. 1) is coupled to one end 13a of a lever 13. This lever is pinned to a shaft 14 which is journaled in plates 40 and 42. The other end 13b (FIG. 1) of lever 13 intersects the path of the shaft 8 in the axial motion of the latter, and in the rest position of shaft 8 with collar 46 against wall 40, rotation of lever 13 is limited by shaft 8.

As seen in the plan view of FIG. 2, a lever 16 is pinned to shaft 14 and is arranged to effect, by operation of a spring 17 (FIG. 1), motion of a lever 19 freely journaled on the shaft 14. As illustrated in the drawings, spring 17 may be either compressed or stretched from its unstressed condition. The lever 19 carries at one end an extension 19a, parallel to shaft 14, which is arranged to coact with a short cylinder 21. The cylinder 21 is split or slotted at 21a and is fixed coaxially to the drum 22 of lowest order in the totalizing drum indicator 62 shown in FIG. 2. Through the slot 21a the hook or extension 19a may move from inside to outside of cylinder 21 and vice versa, and the slot is so positioned circumferentially of drum 22 that when hook 19a can so pass, drum 22 is in its zero position.

The pinion 24, pinned to a shaft 64, is releasably coupled to a pinion 25 by means of a cone-shaped clutch 26. Shaft 64 is journaled at its lower end in a bracket 80 affixed to front plate 40, and at its upper end at an extension 82 (FIG. 2) of top plate 70. The lower member of clutch 26 is axially movable on shaft 64, but is constrained to turn therewith by means of a pin and slot connection therewith indicated at 84 (FIG. 1). The upper, male member of the clutch is affixed to the pinion 25, but both are free to rotate with respect to shaft 64. A spring 65 stresses the two clutch members into engagement, subject to disengagement by operation of the lever 27.

Engagement and disengagement of the clutch 26 is effected by means of a lever 27. During liquid delivery, the rotation imparted to pinion 25 rotates a gear 28 in counterclockwise sense as seen in FIG. 2, gear 28 being stressed for rotation in the opposite direction by means of a spring 29 engaged between gear 28 and an anchor post 66 on a bracket 68 affixed to a top wall plate 70 (FIGS. 2 and 5). The gear 28 includes a sector 28a without teeth in order that it may be rotated through no more than one turn by operation of the pinion 25. The gear 28 moreover includes a lateral stop 28b which limits its rotation under influence of the spring 29, as upon disengagement of clutch 26, when the stop brings up against a fixed abutment 72 on plate 70.

The gear 28 has coaxially fixed thereto a drum 32 having a series of steps cut into the cylindrical side wall thereof after the fashion of a set of stairs. The drum 32 coacts with the cam 7 so that, according to the angular position of cam 7, one or another of these steps will be brought in the course of a delivery to bear against the cam 7. The resulting axial displacement of the shaft 8, permitted at the pin-and-slot coupling 6, will release the lever 13 and permit it to rotate counterclockwise beyond the position shown in FIG. 7 to the position shown in FIG. 1.

The apparatus thus far described, which may be called a predetermining or presetting apparatus, is provided for association with a set of indicator drums such as the drums 62, as to which provision may be made for their automatic resetting to zero before each new delivery or dispensing operation begins. For example, in the application of the invention to a gasoline pump, this resetting operation may be controlled with the aid of the nozzle at the end of the delivery line. The arrangement may be such that when, after completion of a delivery, the nozzle is hung up at the pump, the result is the compression or other stressing of a zero reset spring. Thereafter when the nozzle is removed from its hanger or hook at the pump, as at the beginning of a subsequent delivery operation, the spring last-mentioned is released and effects resetting of the indicator drums to zero.

There will now be described cooperation of the presetting apparatus already described with a drum indicator of this type although it is to be understood that the presetting apparatus of the invention may be employed with any form of indicating mechanism having provision for zero reset.

Figure 6:
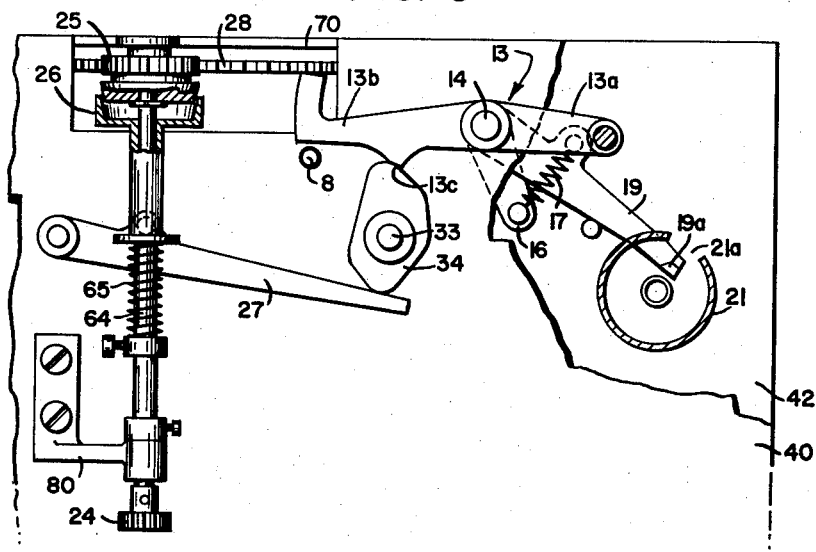
FIGS. 6 and 7 are fragmentary views similar to that of FIG. 1, showing certain elements thereof in reset and in delivery positions respectively.

Let it be supposed that hanging up of the nozzle effects by suitable mechanism rotation of a shaft 33 through an angle of 90°, from the position therefor shown in FIG. 1 to that of FIG. 6. Shaft 33 may be journaled in plate 40, and may be coupled by any suitable mechanism to a hook on which the delivery nozzle, at the downstream end of a flexible hose connected to line 48 (FIG. 1) may be hung between delivery operations. Resilient means may be provided, coupled to shaft 33, to rotate it counterclockwise to the position shown therefor in FIGS. 1 and 7 when the nozzle is removed from the hook, while the weight of the nozzle when hung on the hook will rotate shaft 33 clockwise from the position of FIG. 1 to that of FIG. 6.

On the shaft 33 there is fastened a cam 34 which is arranged to engage with the lever 27 and also with a portion 13c of the lever 13.

The arrangement is such that when the nozzle is hung up (FIG. 6) the end 13b of lever 13 is in its upper position, the lever 27 being down and the clutch 26 being consequently disengaged. In this position, lever 13 is out of the path of axial motion of shaft 8, and shaft 8 advances into the path of lever 13.

Figure 7:
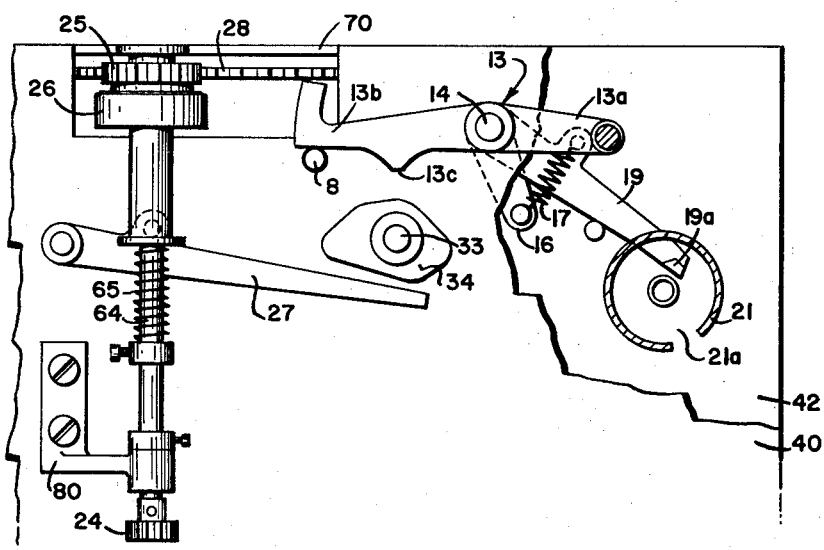

In contrast, when the nozzle is taken down from its hook or hanger, to which operation corresponds the position of the parts shown in FIG. 7, the end 13b of lever 13 is set free of cam 34 and the lever 27 rises, effecting engagement of the two halves of clutch 26. A spring 65 insures engagement of clutch 26 when lever 27 is freed of cam 34. Rotation of lever 13 is however limited by shaft 8, as illustrated in FIG. 7.

The operation of the apparatus is as follows:

(a) *Presetting.*—The wheel 1 is rotated to bring the hole 1a in disc 1 in front of the number on the dial 3 corresponding to the number of units of liquid to be delivered, much as in the operation of a dial telephone. This operation effects rotation of the cam 7 to a position corresponding to the quantity so selected.

(b) *Removal of the Nozzle.*—Before its removal, the elements 13, 27 and 34 are in the position illustrated in FIG. 6. The clutch 26 is consequently disengaged and the end 13b of the lever 13 is held in its upper position by the cam 34. With clutch 26 disengaged, drum 32 and gear 28 are reset clockwise (FIG. 2) to their zero positions. FIG. 2 shows these elements out of zero position, at the conclusion of a delivery. When the nozzle is taken down from its hanger, shaft 33 and its cam 34 rotate through some 90°. The lever 27 is thereupon set free and clutch 26 is engaged. Pinion 25 is thus coupled to pinion 24. Moreover the lever 13 is no longer held in the clockwise position of FIG. 6 by the cam 34. Nonetheless it is not permitted to rotate full counterclockwise to the position of FIG. 1 since it is stopped in the position of FIG. 7 by the shaft 8. Lever 13 is biased by suitable means such as a spring not shown to counterclockwise rotation toward a limit position as shown in FIG. 1 in which valve 52 is completely closed.

(c) *Delivery.*—During the delivery operation the liquid metering device 54 drives the pinion 25 and the stepped drum 32, as well as the counter drum 22. Rotation of drum 32 stresses the spring 29.

(d) *Slowing Down of Delivery.*—When the step on drum 32 selected by the angular position chosen for cam 7 comes into engagement with the cam 7, the drum 32 effects axial displacement of the rod 8 against spring 11, in consequence of which the lever 13 is released for further counterclockwise rotation as by action of the pressure of the fluid on the movable member of valve 52 to which rod 18 is coupled. Extension 19a on lever 19 is thus brought to bear against the inside cylindrical surface of the cylinder 21 coupled to drum 22. The phasing of drum 32 and of the steps thereon is so established that for any preselected amount, release of lever 13 upon shift of shaft 8 axially by action of drum 32 occurs a little before dispensing of the preselected volume of liquid has been completed. These preselected volumes are volumes (typically integral multiples of a unit of liquid measure) upon whose completed delivery cylinder 21 is in its zero position shown in FIGS. 1 and 6.

Figure 4:
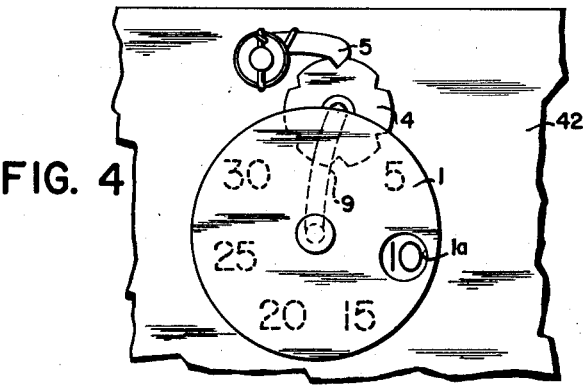
FIG. 4 is a fragmentary rear elevational view of the apparatus of FIG. 1, showing the preselecting means thereof.

Moreover, the drum 22 to which cylinder 21 is affixed being the drum of lowest order, it will typically make many revolutions while drum 32 moves through a fraction of a revolution to the stop position defined for it by cam 7. Thus, if the units of liquid indicated on the dial 3 of FIGS. 4 and 5 are liters or gallons, the cylinder 21 may make one complete revolution per liter or per gallon, and drum 32 will be arranged to effect release of lever 13 from shaft 8 after delivery of the last liter or gallon called for at disc 1 has begun, but before it has ended, so that cylinder 21 has less than one revolution to make before the delivery is complete.

Hence, upon release of lever 13 from shaft 8, the drum 22 is not in zero position, and the slot 21a is not in the path of the extension 19a. Lever 13 therefore rotates until extension 19a comes to bear against the interior of cylinder 21. The accompanying rise of rod 18 effects a partial closure of the delivery valve 52.

(e) *End of Delivery.*—Delivery continues at a reduced rate until the slot 21a appears with rotation of drum 22 opposite the lever extension 19a. Fluid stress on the valve 52 then causes the extension 19a to pass through the slot 21a and this permits complete closure of the delivery valve 52, the drum 22 being in zero position. Accordingly delivery is terminated with an integral number of units of liquid, selected at the dial 3.

(f) *Replacement of the Nozzle.*—When the nozzle is again replaced on its hanger, the shaft 33 with its cam 34 are rotated approximately 90° clockwise to the position of FIG. 6. Clutch 26 is disengaged, freeing the drum 32. Drum 32 is then returned by spring 29 to the position in which its stop 28b brings up against the fixed abutment 72. At the same time the delivery valve 52 opens and the extension 19a passes through the slot 21a back into the cylinder 21. End 13b of the lever 13 is thus raised and shaft 8 is restored to its left-most position (FIG. 5) by means of the spring 11. The apparatus is accordingly ready for a new delivery operation.

I claim:

1. Liquid delivery apparatus comprising a cylinder having a plurality of steps of successively greater cylindrical height formed therein, means to effect rotation of said cylinder through a fraction of a revolution upon delivery of liquid, means to interpose a stop in the path of said cylinder at a height along the axis of said cylinder corresponding to a selected one of said steps, and means responsive to engagement of said cylinder with said stop means to discontinue delivery.

2. Liquid delivery means comprising a cylinder having a plurality of steps of successively increasing height cut into the side wall thereof, liquid metering means having a movable element coupled to said cylinder and movable in accordance with the quantity of liquid passing through said metering means, a plate of variable radius affixed to a shaft in position to intercept said drum at a selected one of said steps according to the angular position of said plate, and means responsive to engagement of said cylinder with said plate to interrupt delivery of liquid.

3. Liquid delivery apparatus comprising a drum, means to rotate said drum through a fraction of a revolution in accordance with the quantity of liquid delivered, said drum having a height increasing at successive angular positions about its axis, a plurality of stops interposable one by one into the path of said drum each at a separate height along the axis of said drum, and means responsive to engagement of said drum with any one of said stops to interrupt the delivery of liquid.

4. Liquid delivery apparatus comprising a valve, a drum, means to rotate said drum through a fraction of a turn in accordance with the quantity of liquid delivered, said drum having a height increasing at successive angular positions about its axis, a stop having a plurality of independent paths of motion, said stop being settable in a plurality of positions in one of said paths to intercept said drum at plural angular positions therefor, means mounting said stop for advance along the other of said paths under the influence of said drum, and means responsive to said advance for changing the setting of said valve.

5. Liquid delivery apparatus comprising liquid metering means, a rotatable drum having a plurality of steps of successively increasing height formed in the side wall thereof, clutch means for releasably coupling said metering means to said drum, means to reset said drum to zero position upon disengagement of said clutch means, a plate of variable radius rotatable to plural positions in each of which it intercepts said drum at a separate one of said steps upon rotation of said drum through a different fraction of a revolution from said zero position, an axially movable shaft supporting said plate, a valve in series with said metering means controlling the passage of liquid therethrough, flow indicating means coupled to said metering means for repetitive, cyclical movement during rotation of said drum from said zero reset position through any of said fractions of a revolution, a lever coupled to said valve, said lever being journaled to engage said shaft except upon axial motion of the latter under influence of said drum, and means coupled to said flow indicating means limiting rotation of said lever in the direction for closure of said valve except at one phase of said repetitive cyclical movement.

References Cited in the file of this patent

UNITED STATES PATENTS 2,812,107    De Young  ---------------  Nov. 5, 1957

FOREIGN PATENTS 187,132    Great Britain  -----------  Oct. 19, 1922